United States Patent
Yuen et al.

[11] Patent Number: 6,147,715
[45] Date of Patent: Nov. 14, 2000

[54] COMBINATION OF VCR INDEX AND EPG

[75] Inventors: Henry C. Yuen, Redondo Beach; Roy J. Mankovitz, Encino; Daniel S. Kwoh, La Canada-Flintridge; Elsie Y. Leung, South Pasadena, all of Calif.

[73] Assignee: Index Systems, Inc., Virgin Islands (Br.)

[21] Appl. No.: 08/952,530

[22] PCT Filed: Mar. 14, 1997

[86] PCT No.: PCT/US97/04074

§ 371 Date: Apr. 24, 1998

§ 102(e) Date: Apr. 24, 1998

[87] PCT Pub. No.: WO97/34413

PCT Pub. Date: Sep. 18, 1997

Related U.S. Application Data

[60] Provisional application No. 60/013,371, Mar. 15, 1996.

[51] Int. Cl.[7] .................................................. H04N 5/445
[52] U.S. Cl. ......................... 348/565; 348/564; 348/906; 386/83
[58] Field of Search .................................... 348/569, 570, 348/563, 565, 584, 906, 6, 7, 8, 5, 705, 706, 731, 732, 554, 555; 386/83, 69, 125, 95; H04N 5/445, 5/50

[56] References Cited

U.S. PATENT DOCUMENTS

| | | | |
|---|---|---|---|
| 5,450,210 | 9/1995 | Yoo . | |
| 5,479,268 | 12/1995 | Young et al. | 358/335 |
| 5,485,221 | 1/1996 | Banker et al. | 348/563 |
| 5,532,754 | 7/1996 | Young et al. | 348/569 |
| 5,534,911 | 7/1996 | Levitan | 348/1 |
| 5,594,509 | 1/1997 | Florin et al. | 348/731 |
| 5,614,940 | 3/1997 | Cobbley et al. | 348/7 |
| 5,621,579 | 4/1997 | Yuen | 386/121 |

FOREIGN PATENT DOCUMENTS

9607270 A1  3/1996  WIPO .

OTHER PUBLICATIONS

International Preliminary Examination Report, dated Oct. 15, 1998, Application No. PCT/US97/04074, 7 pages.

Supplementary European Search Report and Annex to The European Search Report on Europe Patent Application No. EP 97 91 5090 dated Mar. 16, 2000.

*Primary Examiner*—Michael Lee
*Attorney, Agent, or Firm*—Christie, Parker & Hale, LLP

[57] ABSTRACT

A television system has a television viewing mode (50) and a guide mode (56, 58). The guide mode includes an electronic program guide (EPG), which provides the viewer program information for tuned programs, and a tape index guide (TIG), which provides information for programs recorded on a video cassette (16). In both guides, real time images of a program are displayed in a PIP window (50) on the television screen and guide information (56, 58) is displayed in the background. In both guides, the viewer may switch between a currently telecast program or a recorded program. The viewer may access either guide from the television mode and vice versa. In the guide mode, the viewer may independently switch the guide information and the type of program, i.e., tuned or recorded, in the PIP window.

18 Claims, 18 Drawing Sheets

FIG. 11A
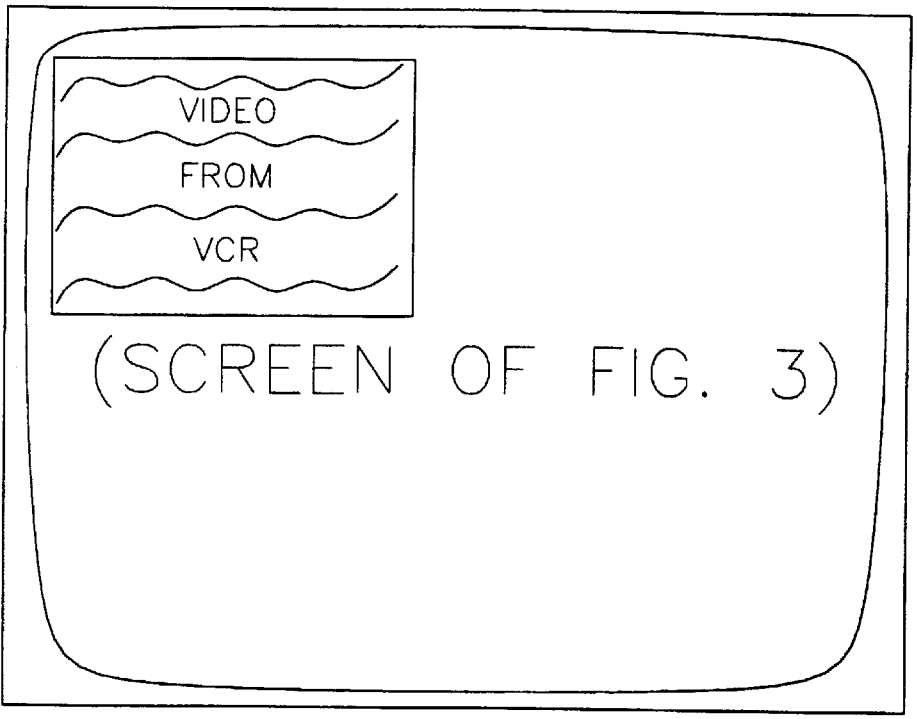
PRESS "INDEX" BUTTON
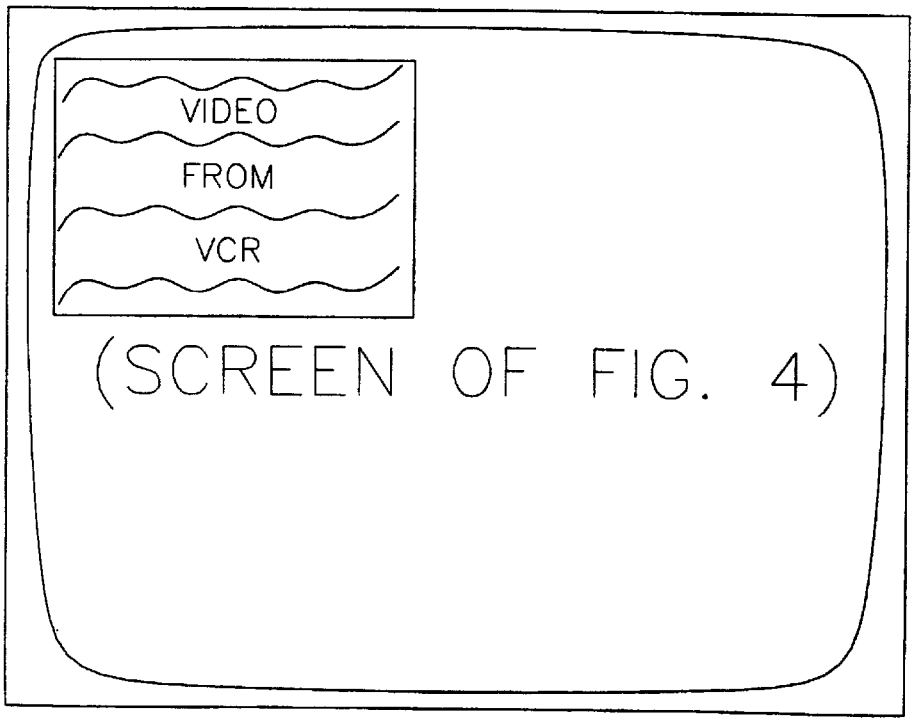

FIG. 11B
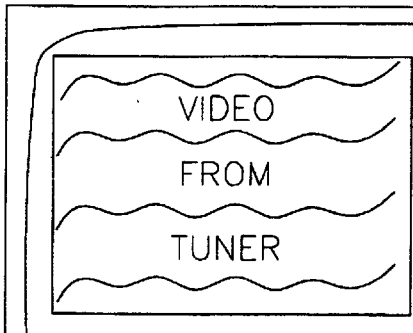
(SCREEN OF FIG. 3)
PRESS "INDEX" BUTTON
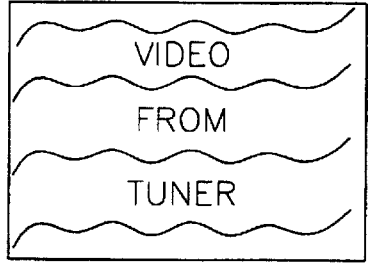
(SCREEN OF FIG. 4)

COMBINATION OF VCR INDEX AND EPG

This application claims benefit of Provisional Appl. No. 60/013,371 filed Mar. 15, 1996.

FIELD OF THE INVENTION

This invention relates to the field of television, and more particularly to a method and apparatus for switching between a television viewing mode and a guide mode which comprises program guide screens, for telecast programs, and video tape index guide screens, for recorded programs.

BACKGROUND OF THE INVENTION

Television systems are available which include various types of on-screen guides to provide a viewer with information about available programs. Electronic program guides (EPG) provide information about currently telecast programs and programs to be broadcast in the future. An EPG includes program listings which provide time, channel, length, and title information for a program and may also provide a brief description of the content of the program in a separate portion of the screen. Many EPG systems have the capability to sort program listings by type, time, or viewer preferences.

Tape indexing systems for video cassette recorders (VCR) allow a viewer to identify a recorded program stored in the viewer's video tape library. Such systems also provide an on-screen directory of programs available on a loaded tape and can automatically scan through the video tape to the position of the desired program stored on the tape.

Some types of EPG and tape index guides include screens with a picture in picture (PIP) window for displaying moving, real time images or still images from a selected television program.

It is desirable to provide a television system which has both types of guides, i.e., an EPG and a tape index guide, and which facilitates navigation in a guide mode between the various guide screens and between the guide mode and a normal television viewing mode, in which a selected television program is viewed full screen.

It is also desirable to provide a viewer with the capability to control which program is displayed in the PIP window in the guide mode in the same manner the viewer would in the normal television viewing mode. This includes switching between tuned channels or between the outputs of the tuner and the VCR.

SUMMARY OF THE INVENTION

A television system according to the present invention includes a tape indexing and searching (TIS) apparatus for generating a tape index display, an electronic program guide (EPG) apparatus for generating an EPG display, a VCR for playing recorded television programs, and a tuner for receiving broadcast television programs. The video outputs of the two guide apparatus are connected to a guide switch and the video output of the tuner and the VCR are connected to a program source switch. A PIP chip is operatively connected to the guide switch and the program source switch such that in an active mode the PIP chip displays on a television screen a PIP window displaying the moving, real time images of a selected program overlaid on a background comprising selected guide information.

Preferably a microprocessor controls and coordinates the operation of the PIP chip and the switches so that the viewer may navigate between the various screens of the guide mode and the normal television viewing mode, and display a desired program in the PIP window.

By pressing a guide/tv button on the remote controller, the viewer may enter either an EPG or tape index guide from the normal television mode and also return to the television mode from either type of guide. In either the television or guide mode, a program source button toggles the program display between a tuned program and a recorded program playing on the VCR. In the guide mode, a guide/index button toggles between the EPG and the tape index guide. In the television mode, a PIP button allows the viewer to view the program being output from one program source, i.e., the tuner or the VCR, while viewing the program output from the other program source full screen.

BRIEF DESCRIPTION OF THE DRAWINGS

The features of a specific embodiment of the best mode contemplated of carrying out the invention are illustrated in the drawings, in which:

FIGS. 11A and 11B are flow diagrams illustrating the operation of an INDEX button in the guide mode;

DETAILED DESCRIPTION

A television system according to a presently preferred embodiment of the invention combines an electronic program guide (EPG) and a tape index guide. The EPG is of the type which provides one or more screens of program listings. These listings may include currently telecast programs and programs to be broadcast in the future. The program listings are sorted by category and by time in different screens of the guide. The EPG includes a picture in picture (PIP) window for display of a currently telecast program. The viewer may change the program displayed in the PIP window by cursoring through listings of currently telecast programs in one of the guides.

The tape index guide system is of the type which is provided with a VBI decoder to decode information, such as title, channel, date, time, and length of broadcast programs and utilizes the information in providing a directory of programs stored on a recorded tape and for controlling the VCR. The tape index guide system is also provided with a VBI encoder for inserting control and directory information onto the tape on which the broadcast program is being recorded, either in the VBI portions of the video track or in the control track of the tape. From the control and directory information stored on the tape, the tape index guide system creates a program directory which may be displayed on the screen. The directory enables the viewer to determine the location of a recorded program in his or her tape library and control the playing of a selected program on a tape loaded in the VCR. The on-screen directory includes a PIP window. The PIP window may be used to display an entire selected program or a selected video clip from the program as the program listing is selected in the directory.

The television system according to the invention allows the viewer access to either type of guide, i.e., EPG or tape index guide, from a television mode and also allows navigation between the two guides in a guide mode.

Figure 1:
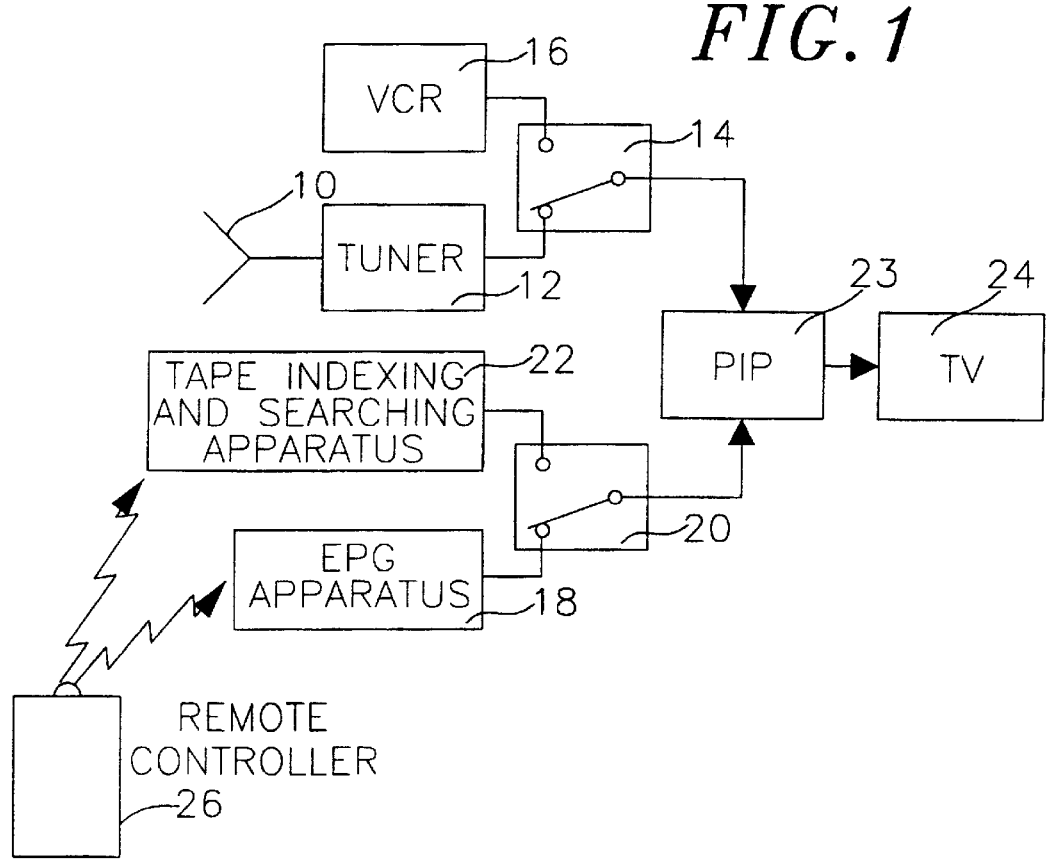
FIG. 1 is a schematic block diagram of apparatus for practicing the invention.

In FIG. 1 a source of television signals 10, such as a terrestrial antenna or cable, is connected by a television tuner 12 to one input of program source switch 14. The video output of a video cassette recorder (VCR) 16 is connected to the other input of switch 14. An EPG apparatus 18 is connected to one input of guide switch 20. A tape indexing and searching (TIS) apparatus 22 is connected to the other input of switch 20. The outputs of switches 14 and 20 are connected to the respective inputs of a conventional PIP integrated circuit chip 23. The output of PIP chip 23 is connected to the video input of a television 24 having a screen (not shown). When PIP chip 23 is turned off, one video program from tuner 12 or VCR 16 is displayed on the screen of television 24 full screen. When PIP chip 23 is turned on, one video program from tuner 12 or VCR 16 is displayed in a PIP window of the screen, while textual material from EPG apparatus 18 or TIS apparatus 22 is displayed in the background. EPG apparatus 18 and TIS apparatus 22 are also connected by hardwire or wireless means (not shown) to tuner 12 and VCR 16. The audio channels from tuner 12 and VCR 16 are coupled by an audio amplifier to a loudspeaker (not shown), which could be that of television 24. A remote controller 26 permits a television viewer to operate the apparatus. Depending upon the physical locations of the various components, one or more microprocessors are used to control the various components— EPG apparatus 18, TIS apparatus 22, tuner 12. VCR 16, and PIP chip 23, as well as switches 14 and 20—responsive to remote controller 26.

Figure 2:
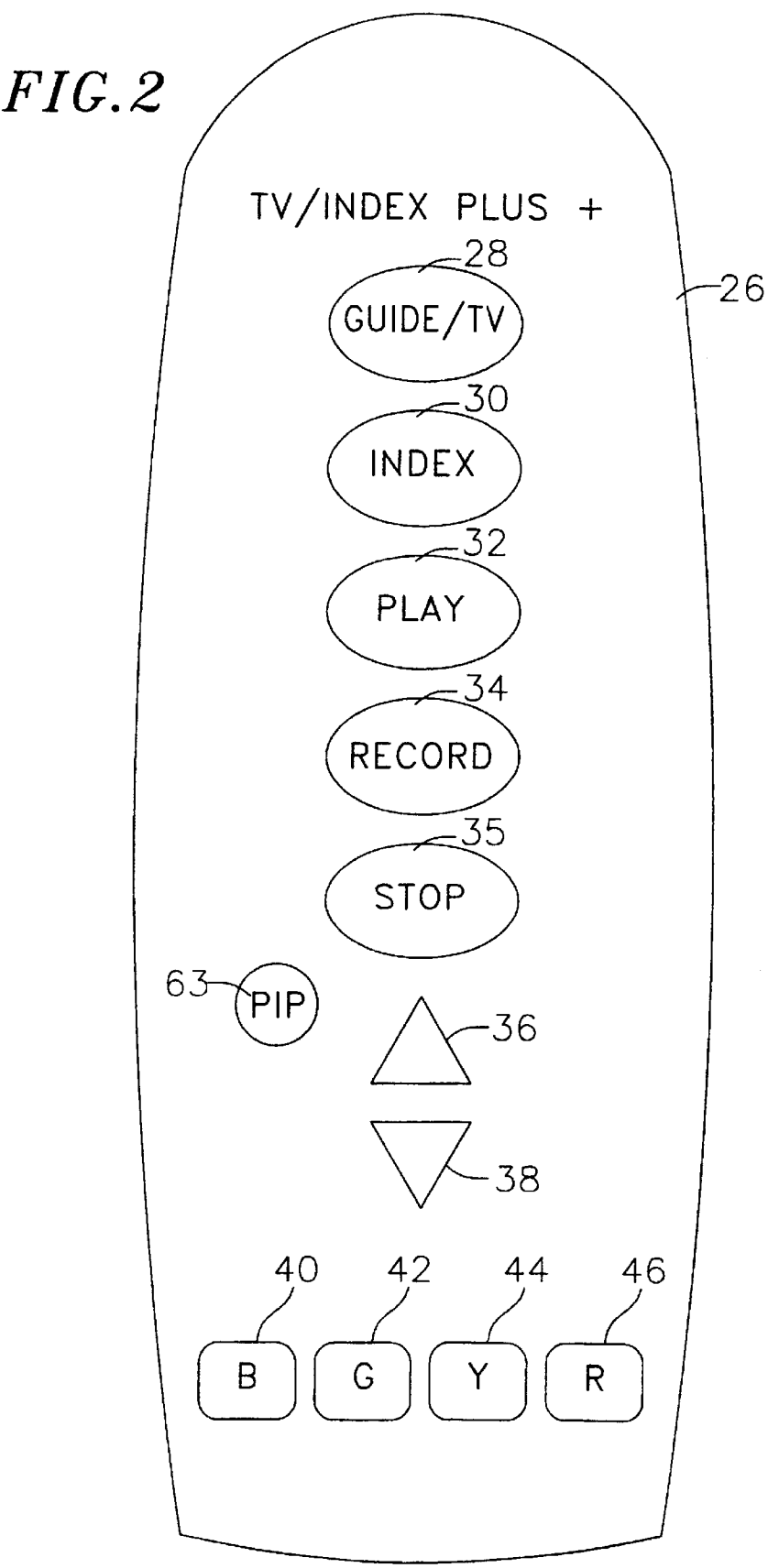
FIG. 2 is a remote controller for operating the apparatus of FIGS. 1 and 9.
Figure 3:
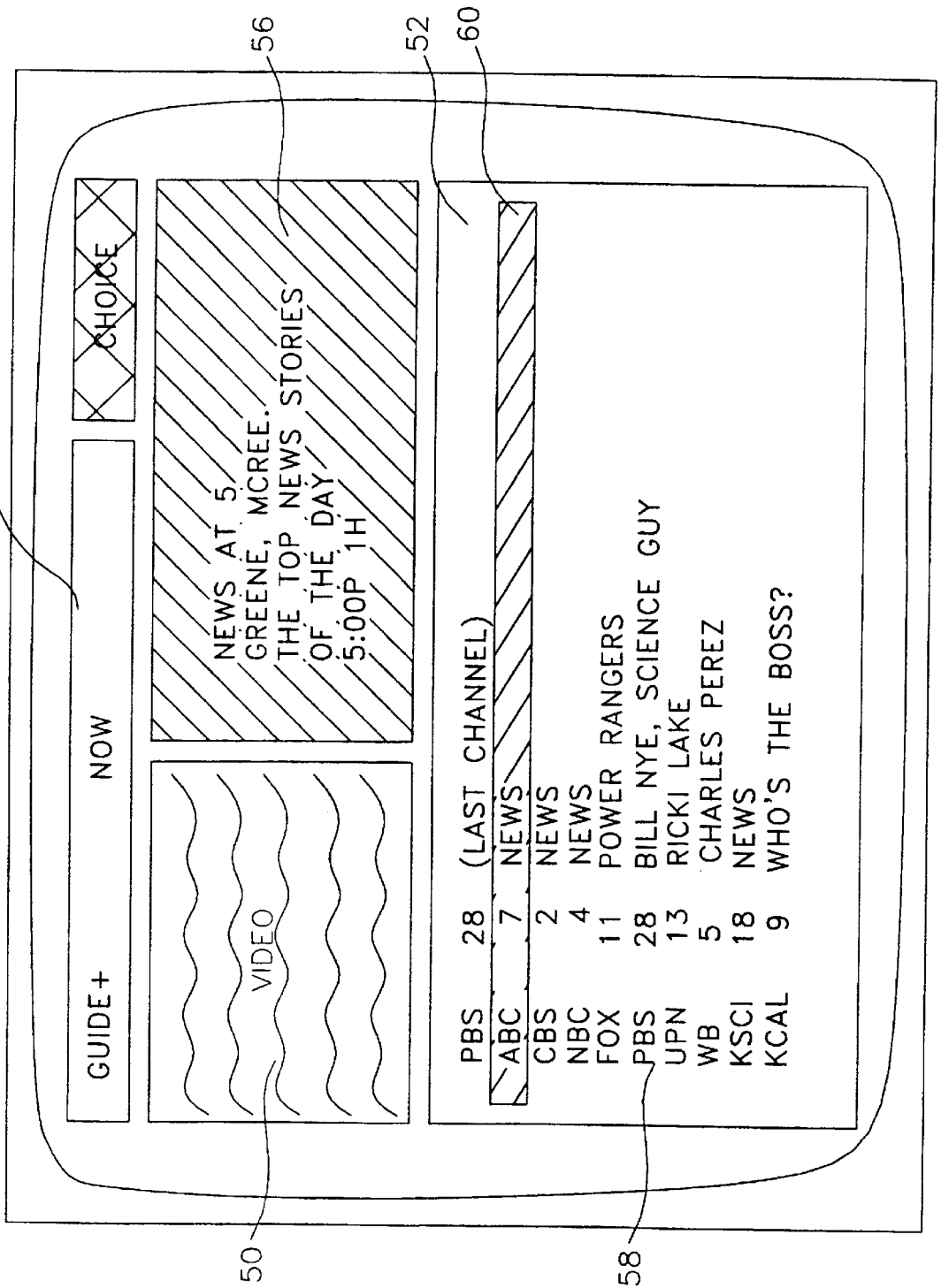
FIGS. 3 to 7 are television screens formatted to practice the invention with the apparatus of FIG. 1.

As shown in FIG. 2, remote controller 26 has a GUIDE/TV button 28, an INDEX button 30, a PLAY button 32, a RECORD button 34, and a STOP button 35, which control the operation of the apparatus in FIG. 1. In an alternate embodiment described below, the remote controller also has a PIP button 62. Up and down arrow buttons 36 and 38 control the movement of an on-screen cursor in television 24. A row of buttons 40, 42, 44, and 46, which are marked with the colors blue (B), green (G), yellow (Y), and red (R), are used to select on-screen color-coded prompts which may be provided on the various guide screens.

The screen formats of FIGS. 3 to 7 each have a PIP window 50 overlaid on a background area 52. Background area 52 includes a banner and message prompting area 54 at the top of the screen, a program description area 56 in the upper right-hand corner of the screen adjacent to PIP window 50, and a program listing area 58 below areas 52 and 56. The viewer can move a cursor 60 vertically to highlight one of the lines displayed in listing area 58 by operating arrow buttons 36 and 3 8 on remote controller 26.

Figure 9A:
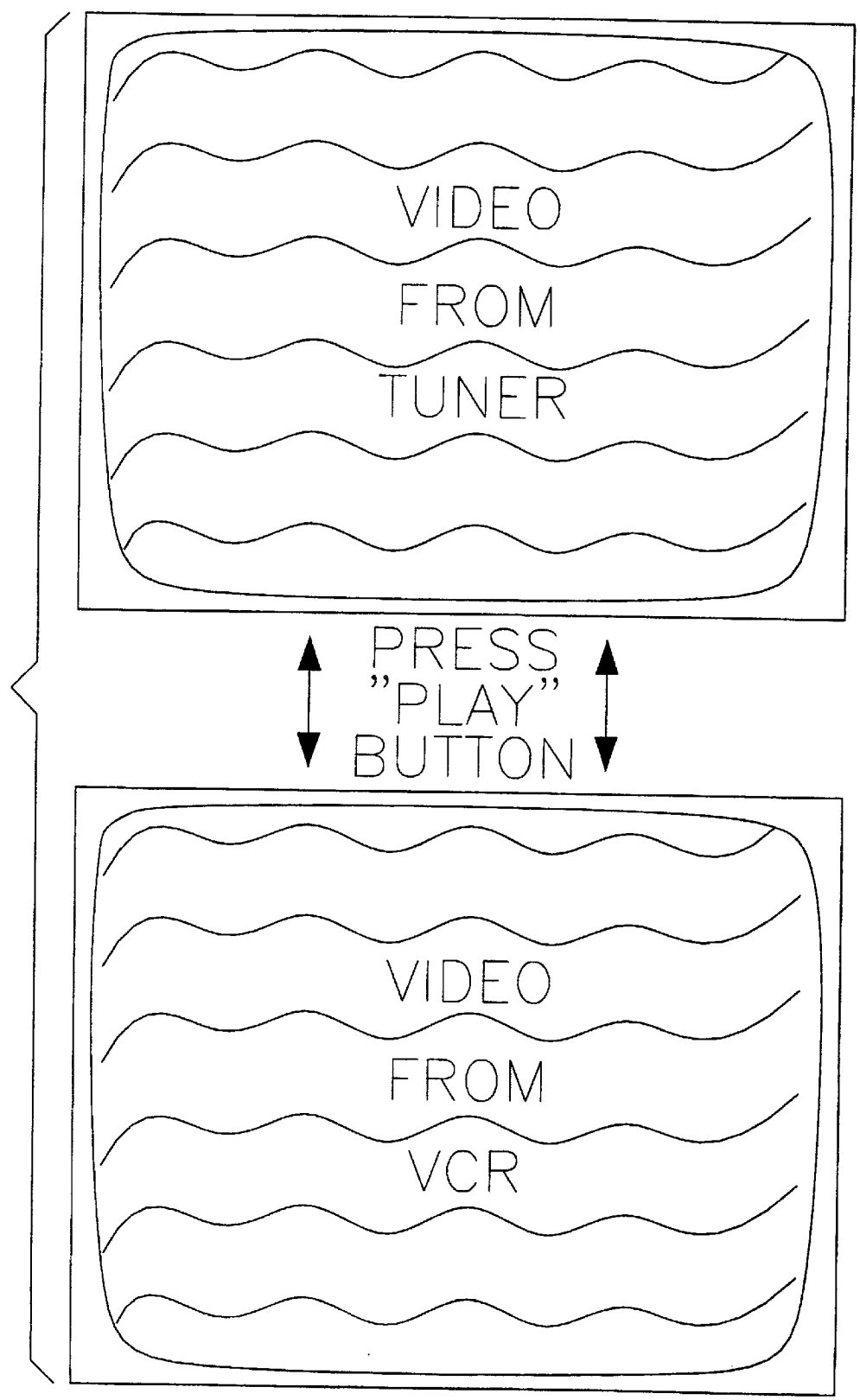
FIG. 9 is a flow diagram illustrating the operation of the PLAY button in either a guide mode or a television viewing mode.
Figure 9B:
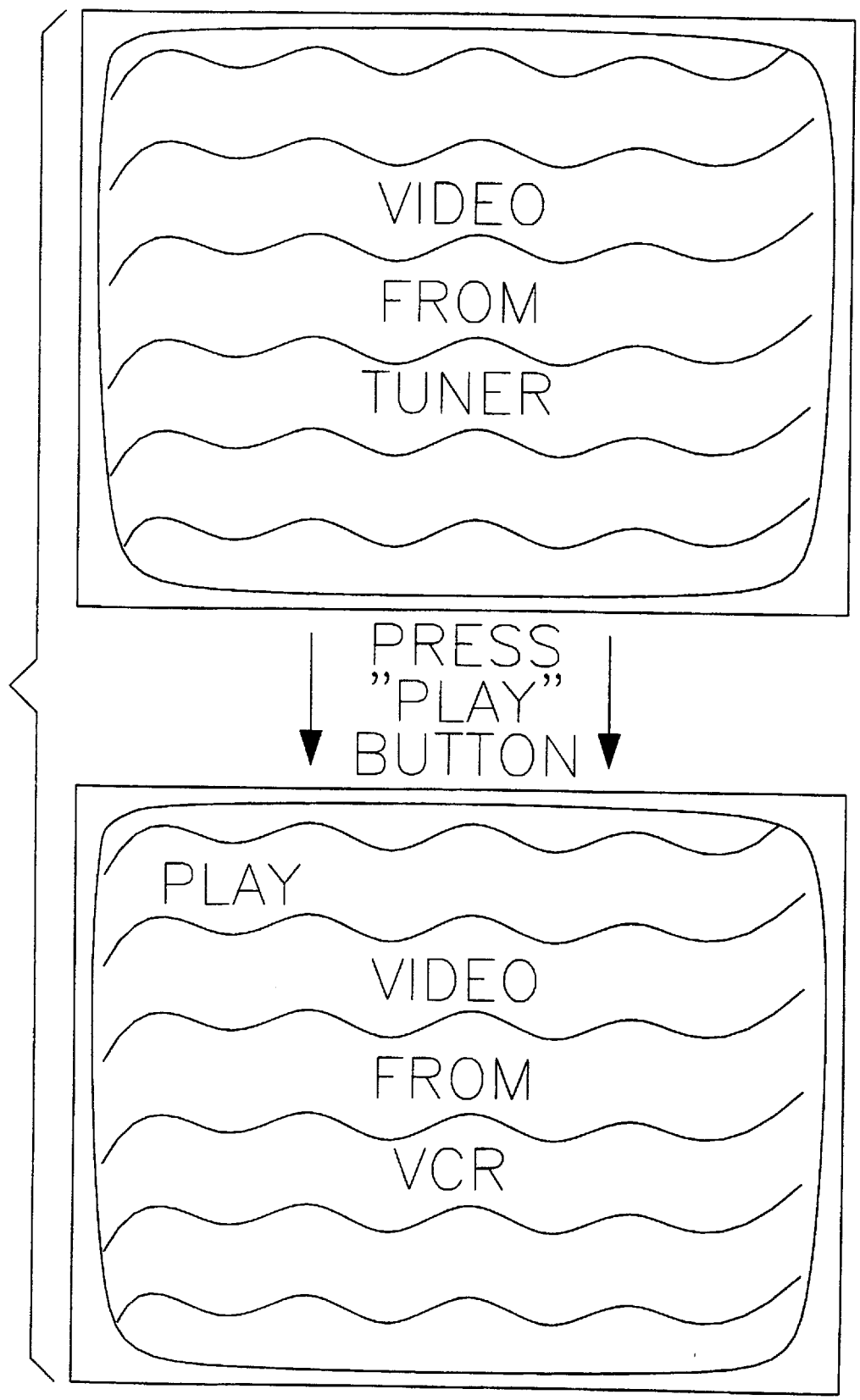

The operation of the apparatus will now be described starting in the television mode with PIP chip 23 turned off. In the television mode, moving, real time images of a program are displayed fill screen on the television. The program displayed may be either a currently telecast program being received by tuner 12, or a recorded program played from a video tape loaded in VCR 16. Switch 14 controls whether the video input to the television is from the tuner 12 or the VCR 16. Switch 14 is controlled by the PLAY button 32 on the remote controller 26. By pressing the PLAY button, the viewer controls the input source to the television and switches between the currently telecast program output from the tuner and the recorded program being output by the VCR, as shown in FIGS. 9A and 9B. Preferably, when no recorded program is being played by the VCR 16, a microprocessor (not shown) associated with the apparatus controls switch 14 to remain switched to the tuner. Alternatively, if a tape is loaded in VCR 16, but not playing, when the viewer presses PLAY button 32, the microprocessor will substantially simultaneously control switch 14 to switch to VCR 16 and control the VCR to play the tape (FIG. 9B).

According to a presently preferred embodiment, the viewer is able to select between a EPG, a tape index guide, and a normal television mode. As used herein, "television mode" refers to normal television viewing wherein a currently telecast or recorded program is displayed full screen. "Guide mode" refers to displaying one of the guide screens according to the invention. which may be either an EPG or a tape index guide. The guide screens comprise graphics in the background area 52 and a program being displayed in the PIP window 50.

The GUIDE/TV button on the remote controller 26 controls guide switch 20 and PIP chip 23 and is used to switch between the television mode and the guide mode. When the viewer presses GUIDE/TV button 28, PIP chip 23 is turned on, guide switch 20 couples EPG apparatus 18 or TIS apparatus 22 to PIP chip 23, and television 28 displays an EPG or tape index guide, respectively.

Figure 10A:
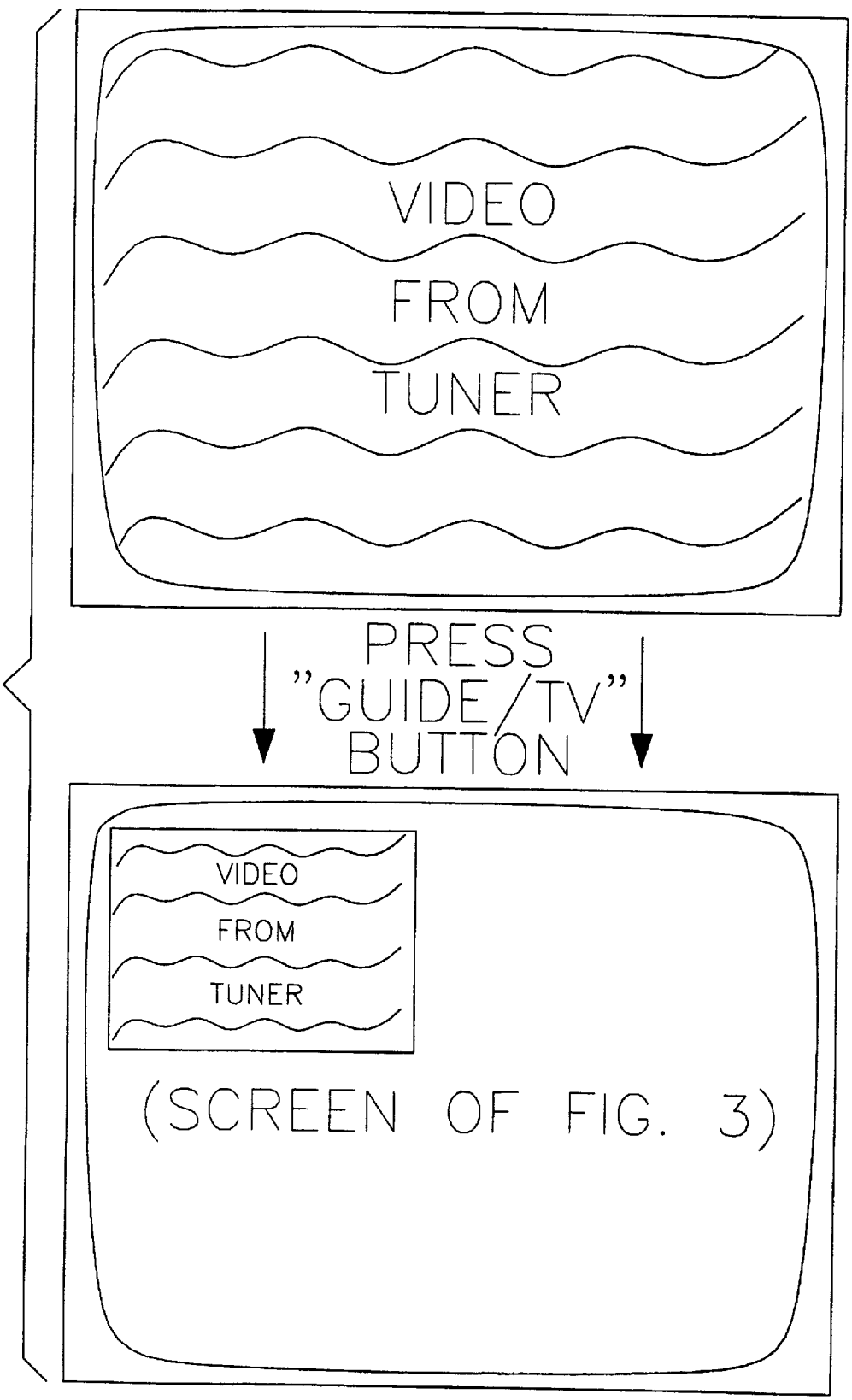
FIGS. 10A and 10B are flow diagrams illustrating the operation of a GUIDE/TV button in the television viewing mode.

Preferably, the microprocessor controlling guide switch 20 is sensitive to the condition of program source switch 14 so that when switch 14 is switched to tuner 12, the microprocessor controls guide switch 20 to couple EPG apparatus 18 to PIP circuit 23 when the GUIDE/TV button 28 is pressed. This causes television 24 to display the screen of FIG. 3. When the EPG is entered directly in this manner, the last channel to which television 28 was tuned in the television mode is displayed at the top of listing area 58, e.g., PBS Channel 28, and EPG information is displayed in listing area 58. The real time telecast program highlighted by cursor 60 in listing area 58 is displayed as a moving real time image in PIP window 50, e.g., the program telecast on ABC Channel 7, and a description of this program is displayed in area 56, as shown in FIG. 10A.

Figure 10B:
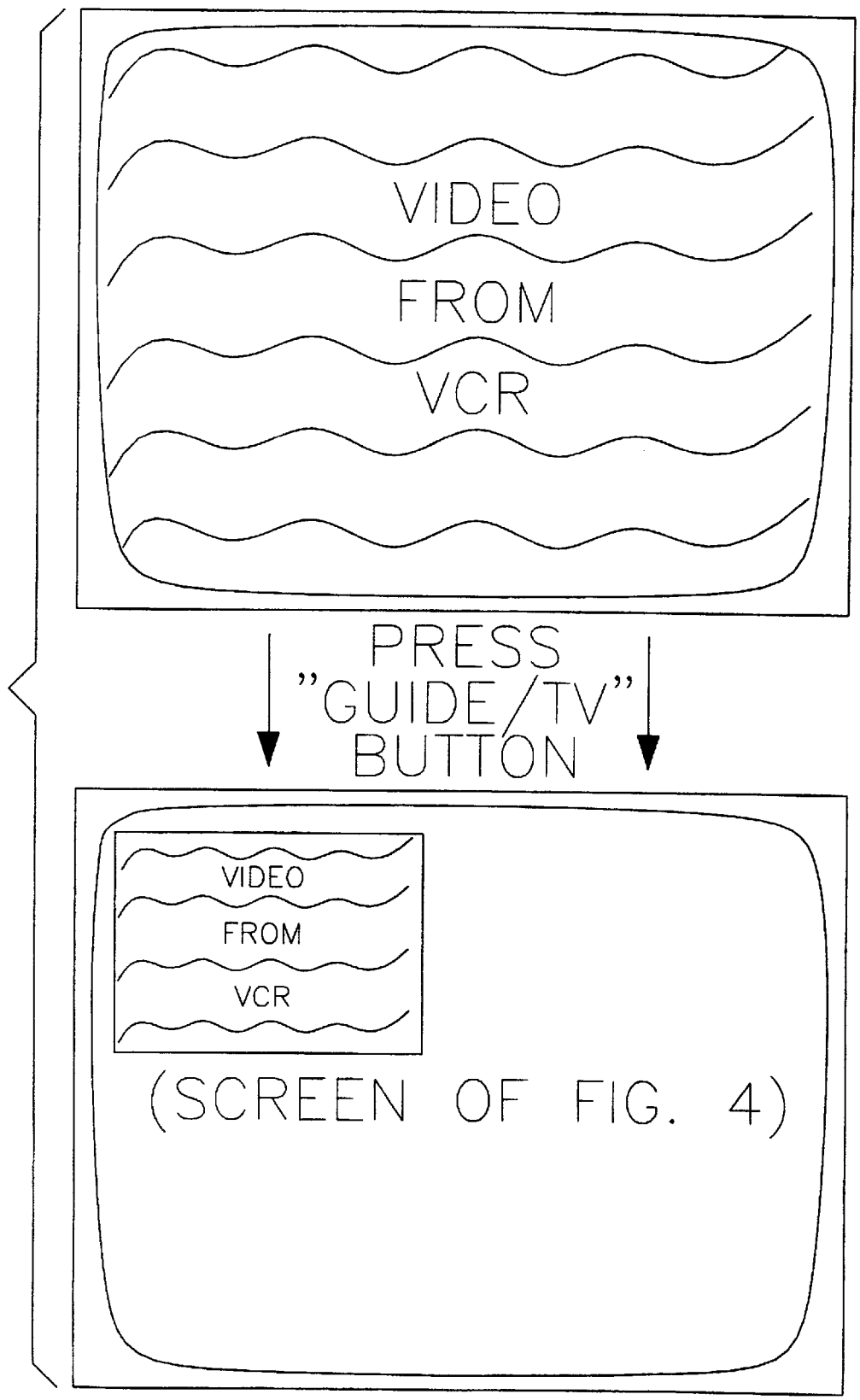

Alternatively, if switch 14 is switched to VCR 16 in the television mode and the viewer presses GUIDE/TV button 28, PIP chip 23 is turned on, and the microprocessor controls guide switch 20 to couple TIS apparatus 22 to television 24 so that tape index guide information is displayed in background area 52 with the program output from the VCR displayed in PIP window 50, as shown in FIG. 10B.

Figure 7:
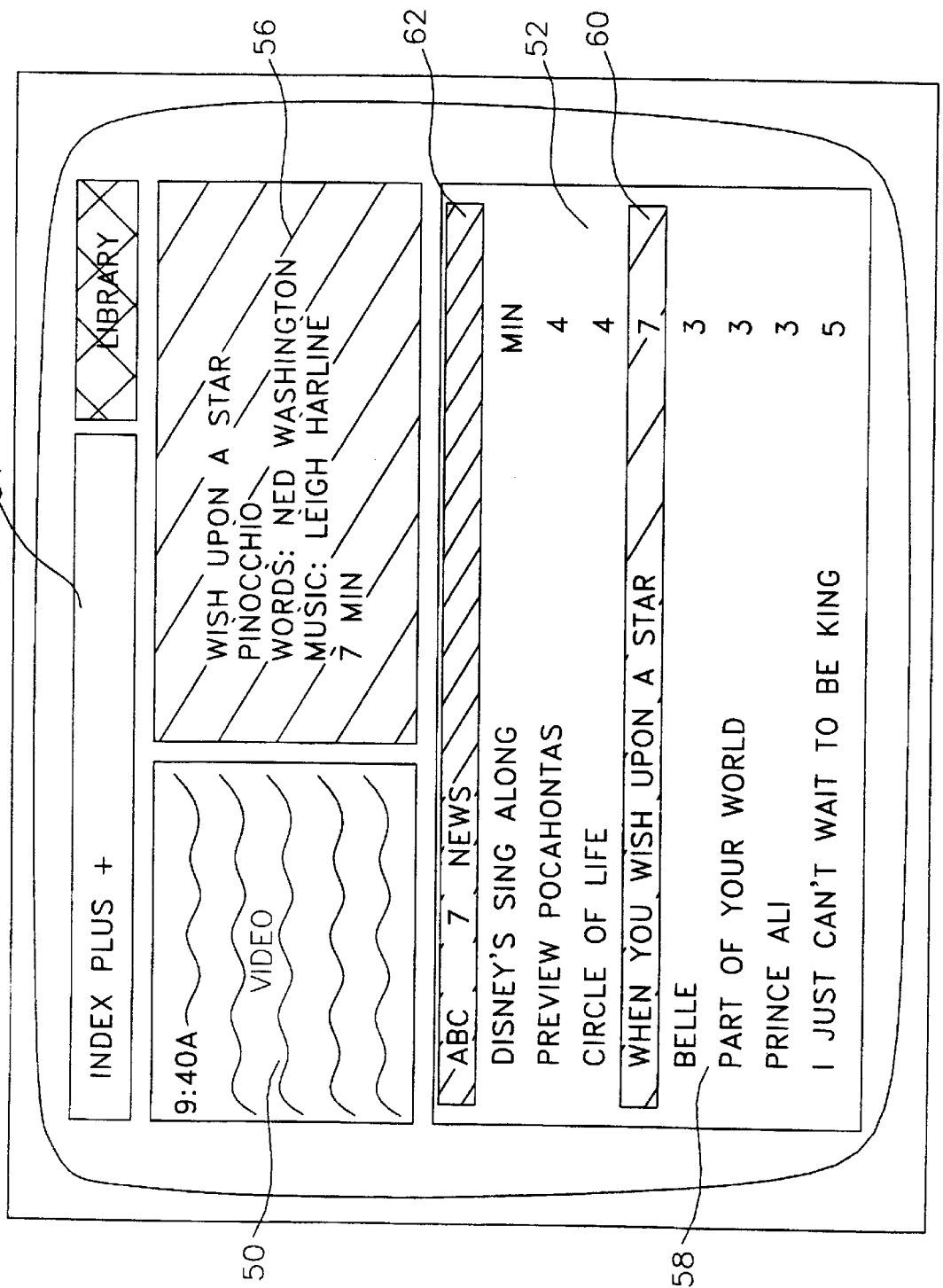

In another preferred embodiment, if the tape playing in the VCR is encoded with control and directory information, the tape index guide screen of FIG. 7 is displayed. A directory of the programs or program, segments on the tape loaded in VCR 16 is displayed in listing area 58. A listing for the program displayed in the PIP window is highlighted by cursor 60 and a description of the program is displayed in area 56. Preferably, when the viewer moves cursor 60 to another listing, TIS apparatus 22 uses the control and directory information stored on the tape to initiate a program searching which it controls VCR 16 to locate and queue up the highlighted program and play the tape so that the newly selected recorded program is displayed in PIP window 50.

Due to the mechanical limitations of the VCR, locating a selected program on a videotape may take the up to a minute or more. Accordingly, it is desirable to delay such a program search by the VCR until the viewer is committed to searching for the recorded program on the tape. This is accomplished in the following alternate embodiments: in one embodiment, the program search is delayed until the program listing in listing area 58 is highlighted with cursor 60 for a set period of time, e.g., 5 seconds. In another embodiment, the viewer initiates a search by positioning cursor 60 on the desired program and then pressing a set sequence of buttons on the remote controller to command TIS apparatus 22.

According to alternate embodiments of the invention, once the selected program, e.g., "When You Wish Upon A Star" in FIG. 7, is finished playing, tape indexing and searching apparatus 22 may either control the VCR to stop automatically, or rewind the tape and repeat playing the selected program, or continue to play the tape so that the next program is displayed i.e., "Belle". The viewer may stop the program by pressing the STOP button 35.

Figure 4:
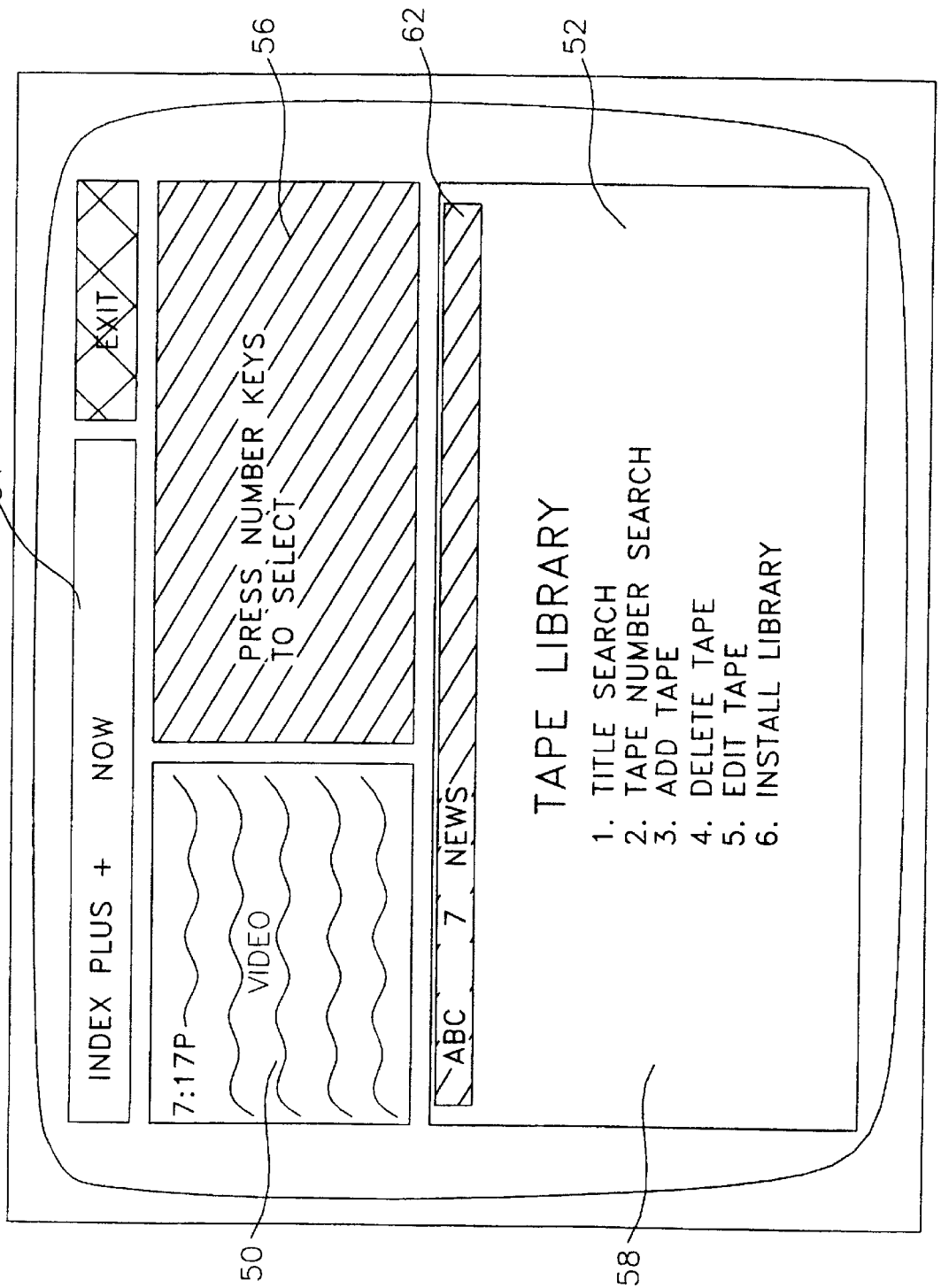
Figure 5:
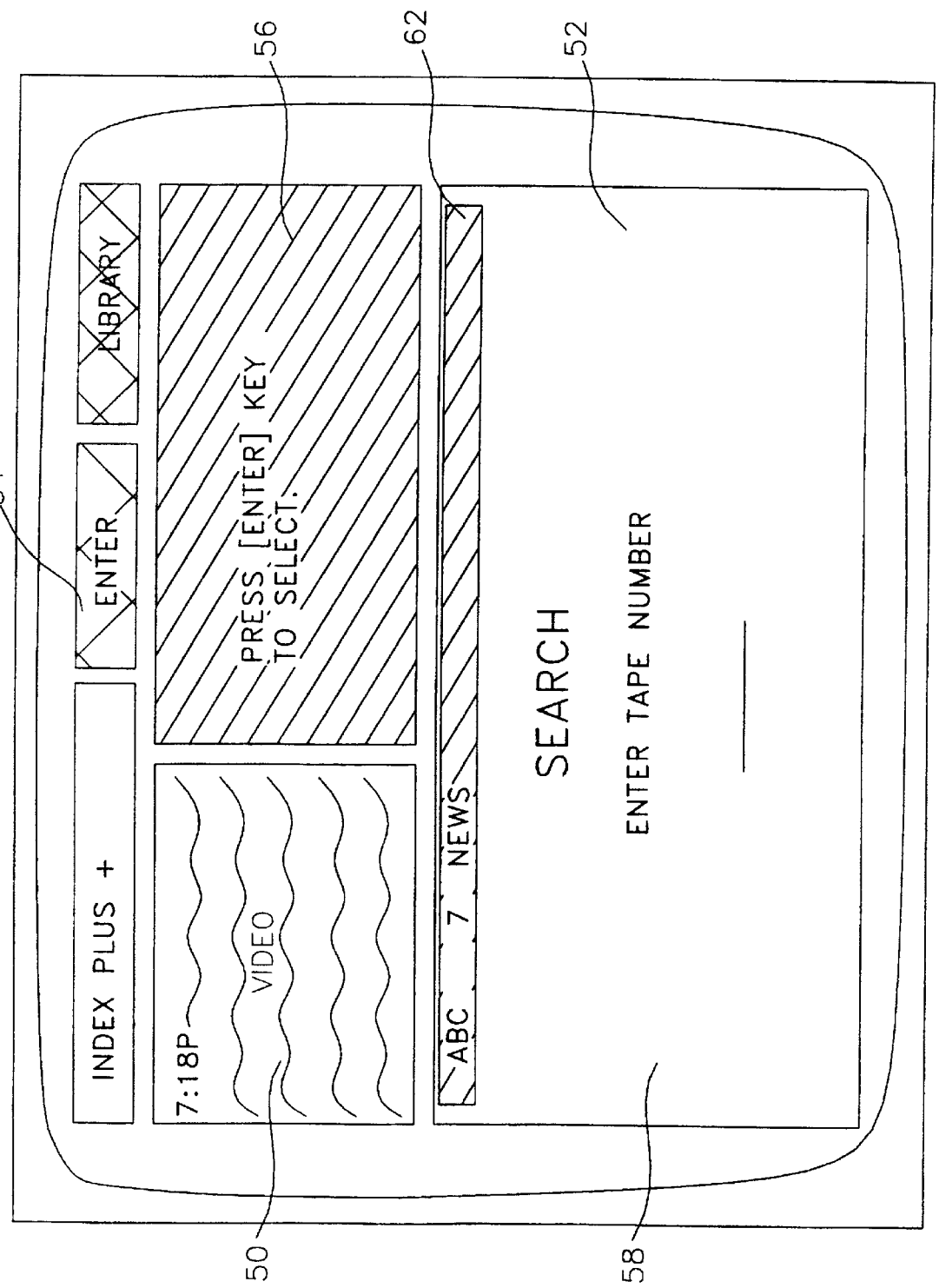
Figure 6:
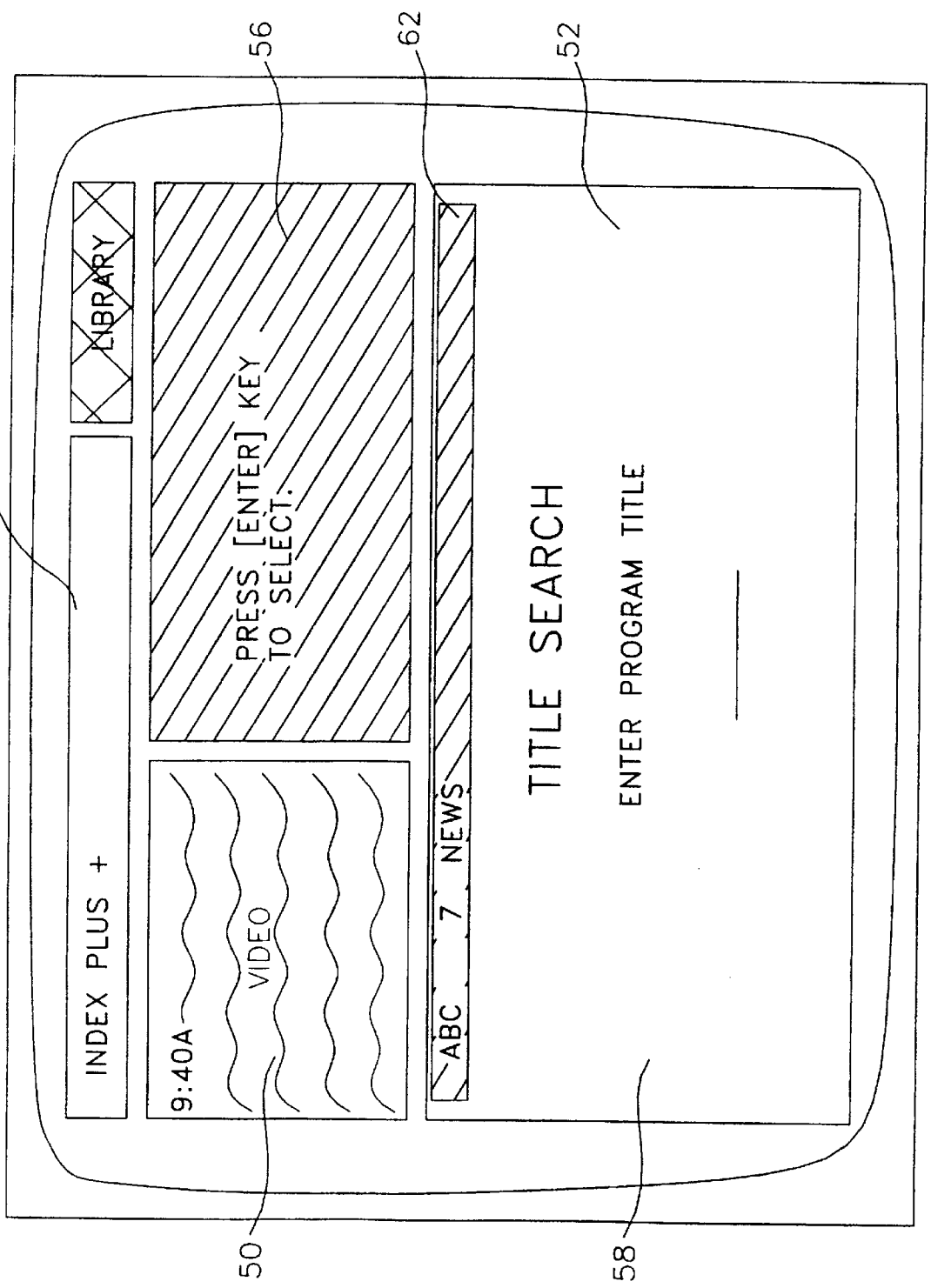

Preferably, if the tape loaded in the VCR is not encoded with control and directory information, the screen of FIG. 4 is displayed. A menu for operation of apparatus 22 is displayed in listing area 58 and a prompting message is displayed in area 56. The viewer inputs a number to identify the function to be performed. The viewer's objective is to identify the video tape on which a program to be played is stored. If the viewer seeks to find the program by video tape number, the viewer inputs the number "1" and the screen shown in FIG. 5 is displayed by television 24. If the viewer seeks to find the program by title, the viewer inputs the number "2" and the screen shown in FIG. 6 is displayed by television 24. After the appropriate tape is loaded in the VCR is loaded, the screen shown in FIG. 7 is displayed. If the program is searched by title (FIG. 6), the selected program will be highlighted by cursor 60 upon entering the screen of FIG. 7. If the program is searched by tape number, the program stored at the beginning of the tape will be highlighted by cursor 60 in listing area 58. In the screen of FIG. 7, when the viewer presses PLAY button 32, the TIS apparatus 22 initiates a program search. As described above, TIS apparatus 22 controls VCR 16 to locate the program selected by cursor 60 on the tape, play the tape and display the selected program in PIP window 50. In an alternate embodiment, when the appropriate tape is loaded, TIS apparatus 22 automatically initiates a program search for the selected program.

While in the guide mode, INDEX button 30 controls switch 20. Thus, from an EPG screen such as that shown in FIG. 3, the viewer may switch to a tape index screen such as that shown in FIG. 4, and vice versa, as shown in FIGS. 11A and 11B. Since only switch 20 is controlled by INDEX button 30, according to this embodiment, the program being displayed in PIP window 50 is unchanged as the background 52 is switched between an EPG and a tape index guide. Preferably INDEX button 30 is inoperable in the television mode.

PLAY button 32 controls program source switch 14 in either the television mode or the guide mode to switch between tuner 12 and VCR 16. Thus, the viewer may switch between the program output by VCR 16 and the program output by tuner 12 in the PIP window 50 while in the guide mode. Also, if a tape is loaded in VCR 16 and is not playing, pressing PLAY button 32 will cause the VCR to begin playing the tape when switching program source switch 14 from tuner 12 to VCR 16. Preferably a highlighted area 62 which includes the program listing for the program tuned by the tuner is included in area 52 of the tape index guide screens. This allows the viewer to identify the currently telecast program displayed in the PIP window 50 while in the tape index guide.

Preferably, if the viewer enters the tape index guide from the EPG and no video tape is loaded in VCR 16, television 24 displays the screen of FIG. 4, with the program output from the tuner displayed in PIP window 50 (e.g., ABC Channel 7). The viewer navigates from tine screen of FIG. 4 to the screen of FIG. 7 as described above. A description of the recorded program in listing area 58 highlighted by cursor 60 is displayed in area 56. Thus, the viewer can scan the descriptions of the recorded programs in area 56 by moving cursor 60 with arrow keys 36 and 38, while continuing to see the currently telecast program in PIP window 50. After the viewer identifies and loads into VCR 16 the video tape on which the desired program is recorded, the screen of FIG. 7 is displayed. If the viewer knows the tape in advance, the menus of FIGS. 4 to 6 can be bypassed by loading the tape into VCR 16 before pressing INDEX button 30.

Figure 12A:
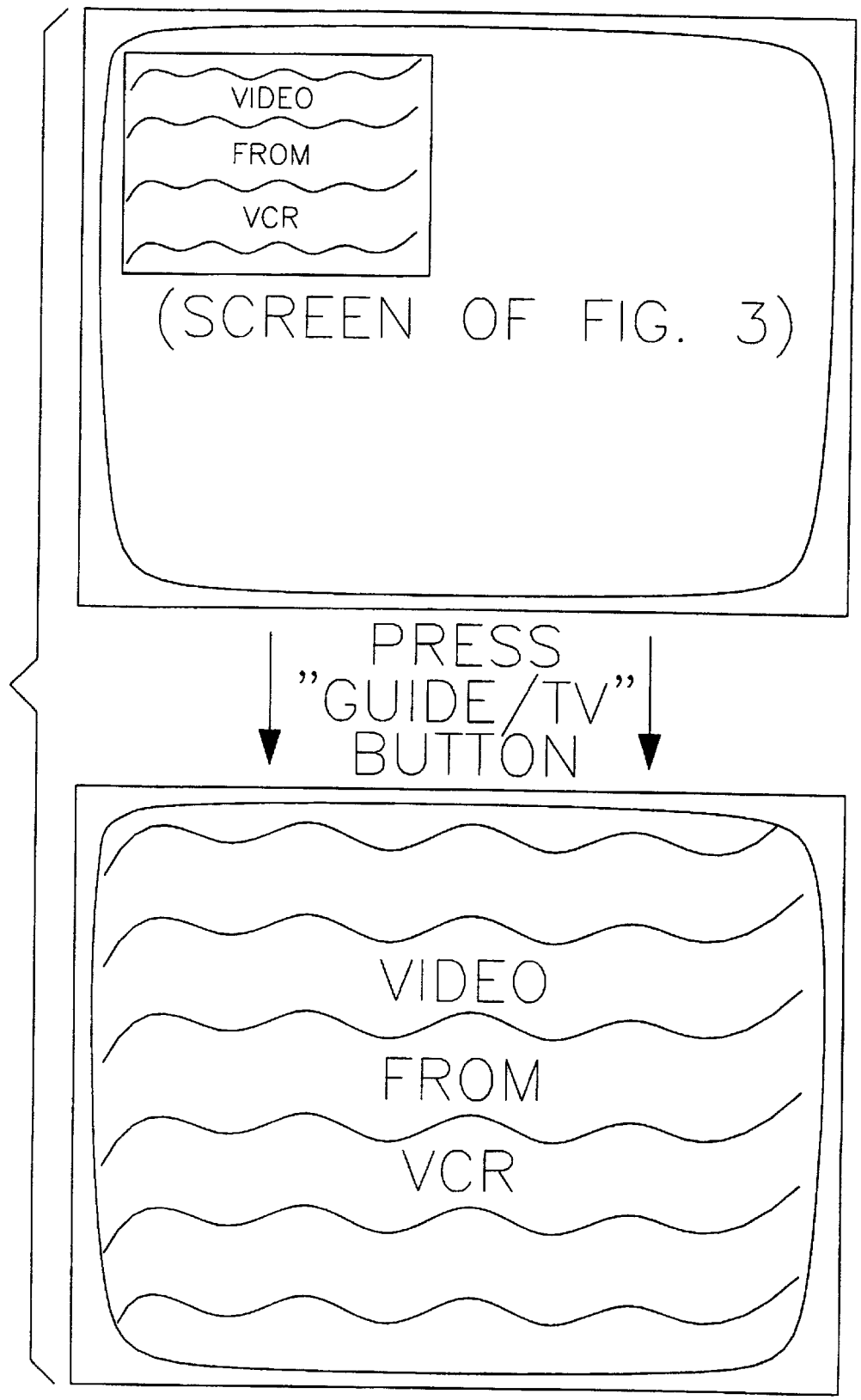
FIGS. 12A and 12B are flow diagrams illustrating the operation of the GUIDE/TV button in the guide mode.
Figure 12B:
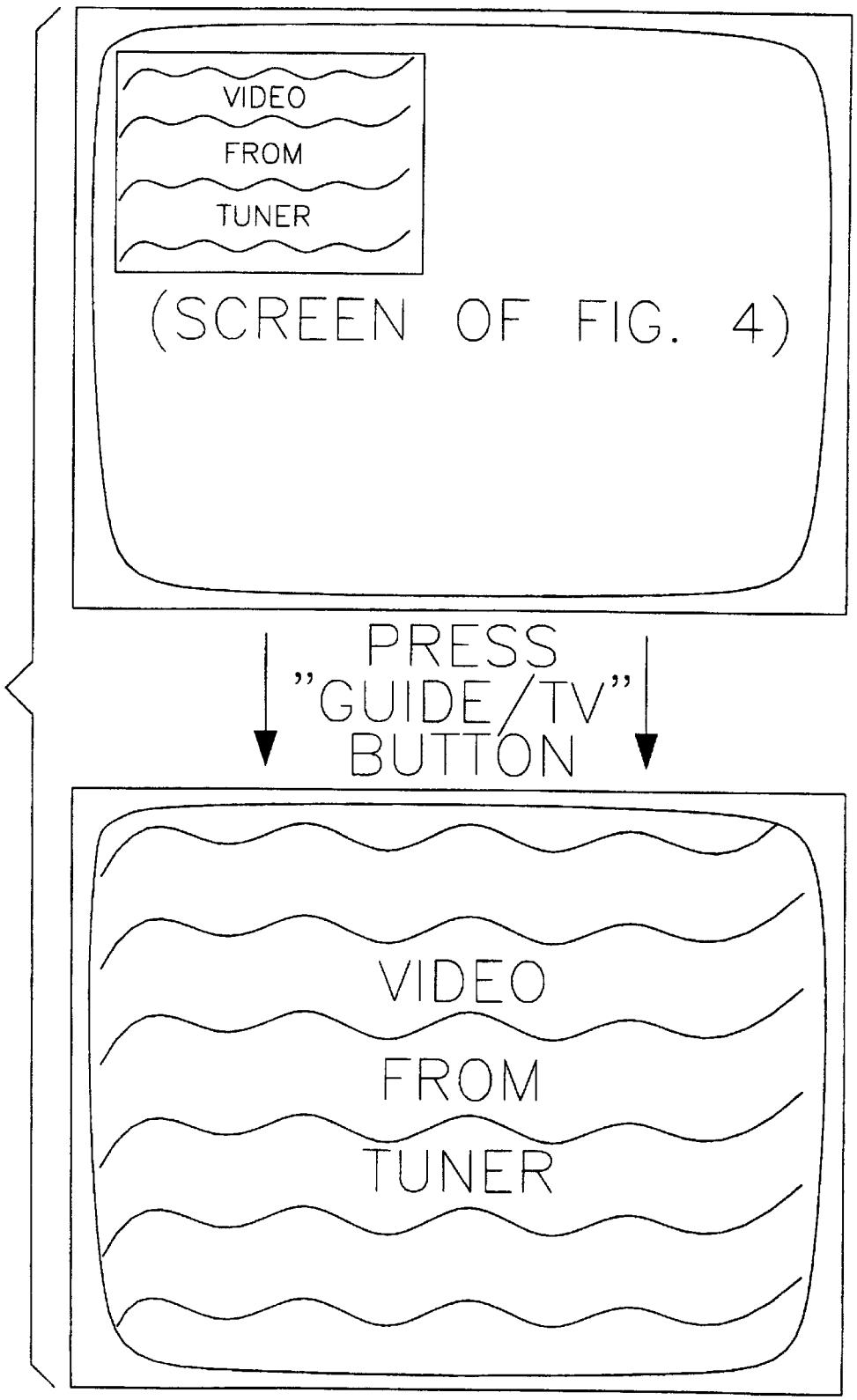

The viewer may exit the guide mode, from either the EPG or the tape index guide, using GUIDE/TV button 28. When the user presses the GUIDE/TV button while in the guide mode, the PIP chip 23 is turned off. Thus, the program source to which program source switch 14 is switched, i.e., tuner 12 or VCR 16, will be directly coupled to the television and the program output from that program source will be displayed full screen, as shown in FIG. 12A and 12B.

In all the described modes, the sound accompanying the video program displayed in PIP window 50 is reproduced by the loudspeaker of television 24.

Figure 8:
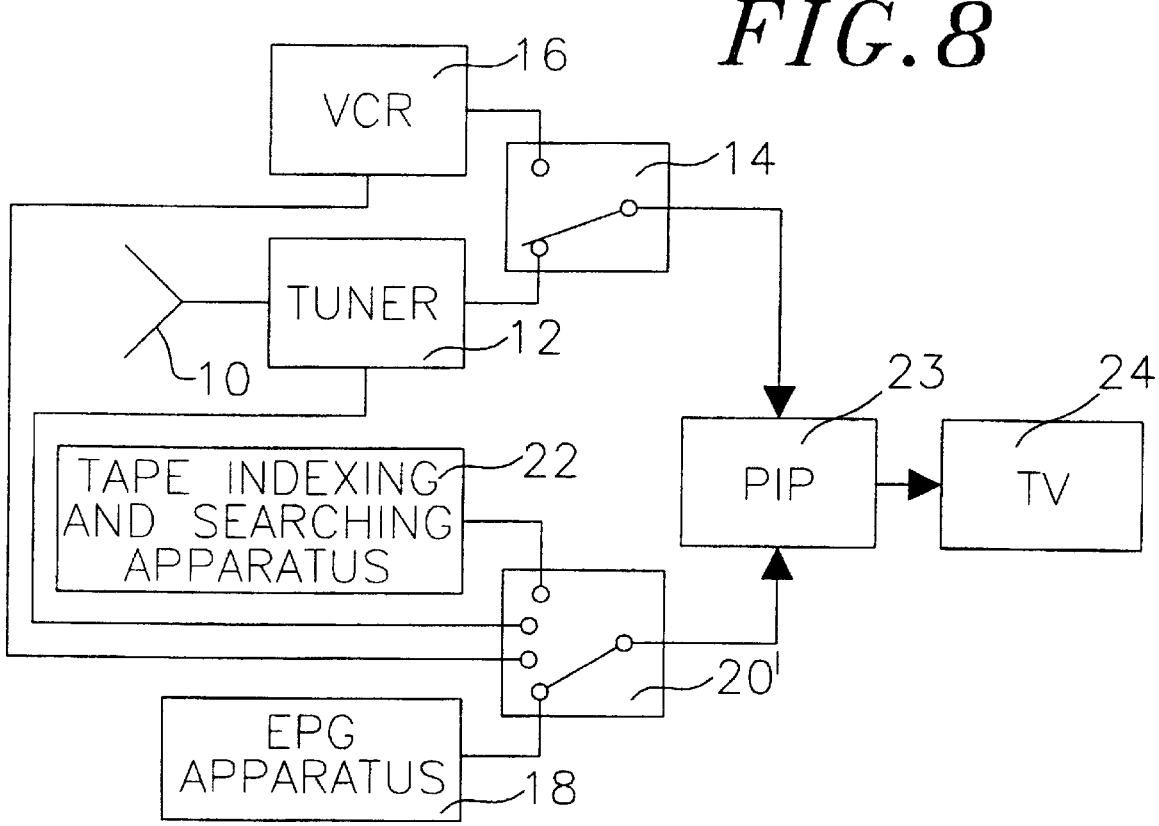
FIG. 8 is a schematic block diagram of another embodiment of apparatus for practicing the invention.
Figure 13A:
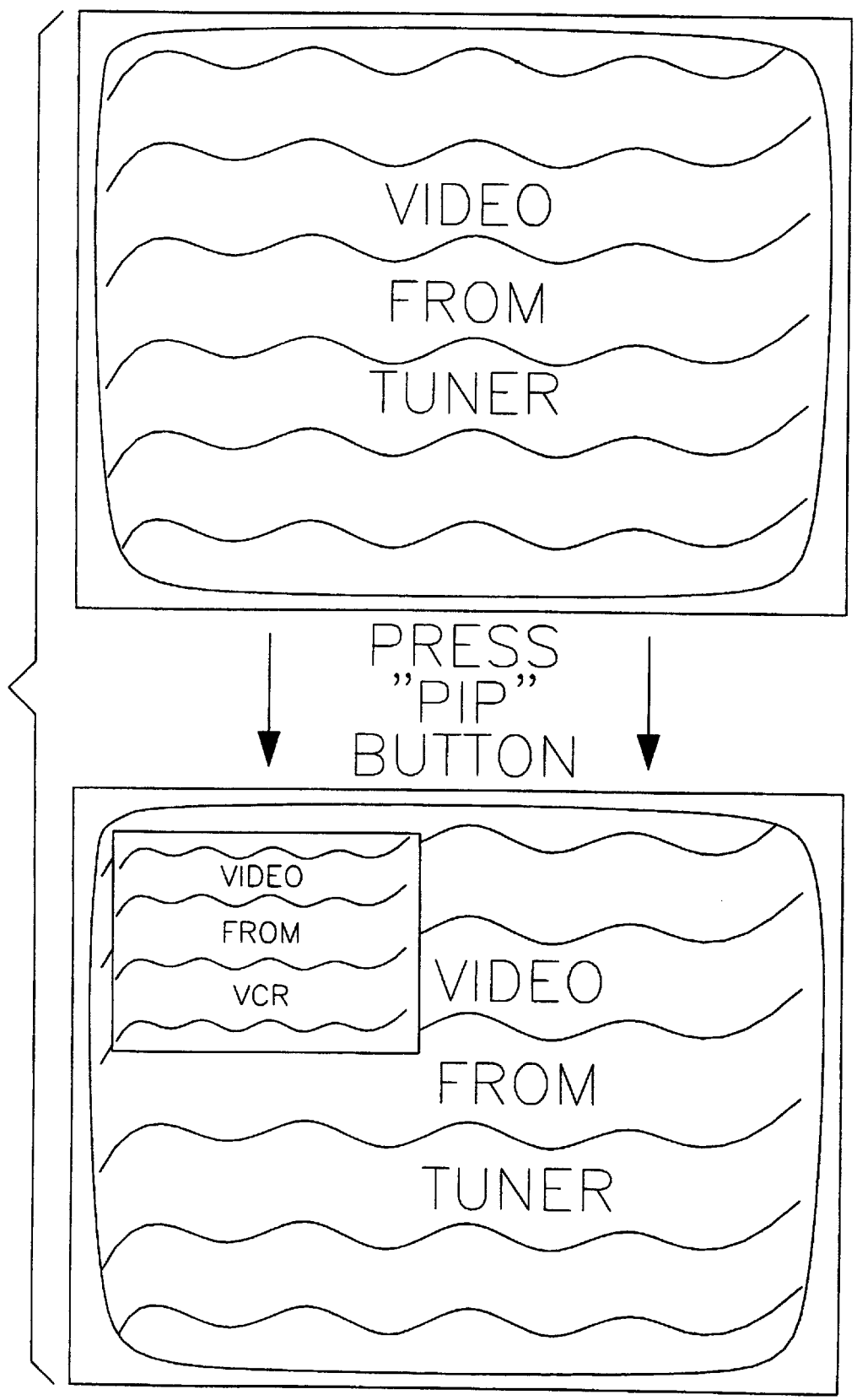
FIGS. 13A and 13B are flow diagrams illustrating the operation of a PIP button in the television viewing mode.
Figure 13B:
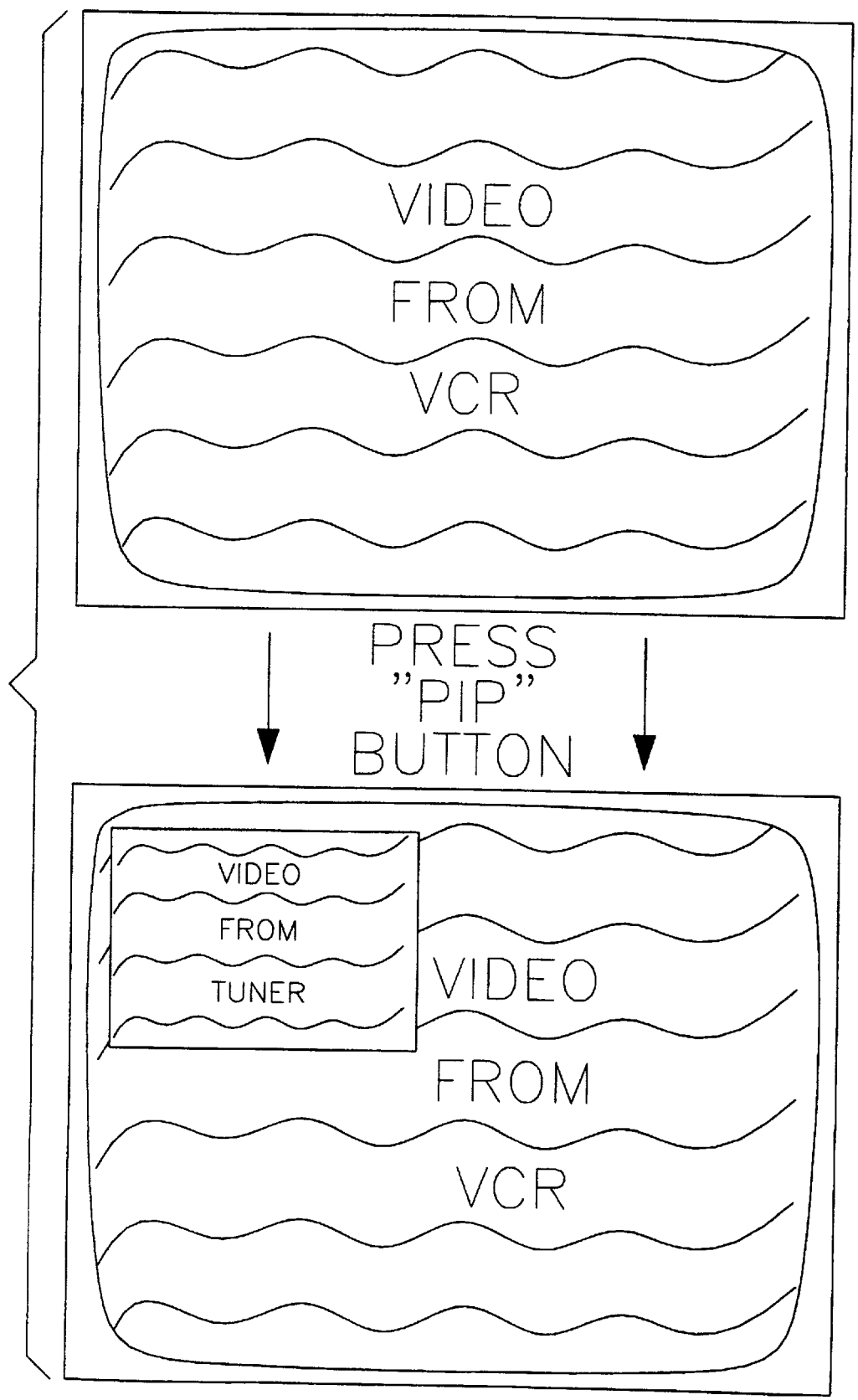

According to yet another alternate embodiment of the invention, the apparatus may be configured to display a PIP window 60 in the television mode, thereby allowing the viewer to view the recorded program being output by VCR 16 and the currently telecast program being output by tuner 12 simultaneously. As shown in FIG. 8, the VCR 16 and tuner 12 are both connected to switch 20' which switches between the video signals input from TIS apparatus 22, EPG apparatus 18. VCR 16, and tuner 12. According to this embodiment, a PIP button 62 is provided on remote controller 26 (FIG. 2). Switch 20' is controlled by a microprocessor (not shown) which is sensitive to the condition of switch 14. In the television mode, when the viewer presses the PIP button 63, the PIP chip is turned on and the controller controls each of program source switch 14 and switch 20' to switch to either the tuner or VCR output such that the last program currently being displayed full screen is displayed in the background 52 and the program from the other component (VCR 16 or tuner 12) is displayed in the PIP window 60. as shown in FIGS. 13A and 13B. If when PIP button 63 is pressed, the tuner is selected and no program is being output from the VCR. the microprocessor preferably does not turn on PIP circuit 23 and instead displays a prompt indicating that no tape is loaded in the VCR. or that the VCR is not playing, depending on the condition of the VCR. Preferably, the PIP button 63 is inoperable while the apparatus is in the guide mode.

Although certain preferred embodiments of the present invention have been described herein, many modifications and variations will be apparent to those skilled in the art. It is therefore to be understood that the scope of the invention should be limited only by the appended claims.

What is claimed is:

1. A method of selecting programs for viewing comprising the steps of:
creating a directory of a plurality of programs recorded on a storage medium, the directory including the titles of said recorded programs and the locations of said recorded programs;
creating a directory of a plurality of programs broadcast from a plurality of information providers, the directory including the titles of said broadcast programs and the channels of said broadcast programs;
alternatively displaying said directory of recorded programs or said directory of broadcast programs;
alternatively displaying a program from one of said broadcast programs or a program from one of said recorded programs simultaneously with the displayed directory;
marking one of the program titles from said directory of recorded programs displayed in the displaying step;
retrieving the program corresponding to the marked program title; and
displaying the retrieved program simultaneously with the displayed directory by replacing the displayed program with the retrieved program.

2. The method of claim 1, additionally comprising the steps of tuning a television tuner to a channel receiving a desired program and substituting the desired program for the retrieved program.

3. The method of claim 2, wherein said retrieving step comprises retrieving the marked program from the storage medium at the location corresponding to the marked program.

4. The method of claim 1, wherein said retrieving step comprises tuning a television tuner to the channel at which said marked program is being broadcast.

5. The method of claim 1, in which the step of displaying the retrieved program on the screen simultaneously with the directory displays the retrieved program in a PIP window.

6. The method of claim 1, in which the creating step creates a directory of programs recorded on a video cassette tape.

7. The method of claim 1, additionally comprising the step of displaying the retrieved program on the screen in a full screen format.

8. The method of claim 7, additionally comprising the steps of tuning a television tuner to a channel receiving a desired program and substituting the desired program for the retrieved program.

9. Apparatus for selecting programs to be played by a VCR or received by a television tuner comprising:
a television monitor having a screen;
a video signal mixer having a first input for accepting a signal to be displayed in a first field on the screen and a second input for accepting a signal to be displayed in a second field on the screen;
a VCR for accepting a video cassette tape;
a television tuner;
a first switch alternatively coupling the VCR and the tuner to the first input of the video signal mixer;
a first source of electronic program guide (EPG) data for telecast television programs;
a second source of tape directory data for video cassette tapes accepted by the VCR;
program selector configured to select a recorded program from the tape directory data; and
a second switch alternatively coupling the first source and the second source to the second input of the video signal mixer to simultaneously display a program recorded on the video cassette tape or a telecast program from the telecast television programs in the first field and the EPG data or the tape directory data in the second field;
wherein the second switch provides the selected program to replace a program being displayed in the first field when the program selector selects the recorded program from the tape directory data.

10. The apparatus of claim 9, in which the video mixer is a PIP chip.

11. The apparatus of claim 9, in which the first source comprises telecast program title data.

12. The apparatus of claim 9, in which the first source comprises telecast program channel designation data.

13. The apparatus of claim 9, in which the first source comprises telecast program start time data.

14. The apparatus of claim 9, in which the first source comprises telecast program description data.

15. The apparatus of claim 9, in which the second source comprises recorded program title data.

16. The apparatus of claim 15, additionally comprising means for marking one of a plurality of titles in the second field and displaying the program corresponding to the marked title in the first field.

17. The apparatus of claim 9, in which the second source comprises recorded program length data.

18. The apparatus of claim 9, in which the second source comprises recorded program description data.

* * * * *